United States Patent
Kidera et al.

(10) Patent No.: US 9,479,079 B2
(45) Date of Patent: Oct. 25, 2016

(54) CONTROL METHOD FOR INVERTER DEVICE, AND INVERTER DEVICE

(71) Applicant: Panasonic Corporation, Osaka (JP)

(72) Inventors: Kazunori Kidera, Osaka (JP); Mariko Nishi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 181 days.

(21) Appl. No.: 14/360,812

(22) PCT Filed: Nov. 15, 2012

(86) PCT No.: PCT/JP2012/007320
§ 371 (c)(1),
(2) Date: May 27, 2014

(87) PCT Pub. No.: WO2013/080465
PCT Pub. Date: Jun. 6, 2013

(65) Prior Publication Data
US 2014/0307489 A1    Oct. 16, 2014

(30) Foreign Application Priority Data
Nov. 30, 2011 (JP) .................. 2011-262404

(51) Int. Cl.
*H02M 7/49* (2007.01)
*H02M 7/487* (2007.01)
(Continued)

(52) U.S. Cl.
CPC ............ *H02M 7/49* (2013.01); *H02M 7/487* (2013.01); *H02M 7/5395* (2013.01); *H02M 7/493* (2013.01); *H02M 7/5387* (2013.01)

(58) Field of Classification Search
CPC ...... H02M 7/483; H02M 7/487; H02M 7/49; H02M 7/493; H02M 7/501; H02M 7/5387; H02M 7/5395
See application file for complete search history.

(56) References Cited

U.S. PATENT DOCUMENTS

2006/0114623 A1* 6/2006 Domoto ............ G01R 33/3852
361/18
2007/0195567 A1* 8/2007 Morishita ................ H02M 7/49
363/55

(Continued)

FOREIGN PATENT DOCUMENTS

CN    101931337 A    12/2010
CN    101980437 A    2/2011
(Continued)

OTHER PUBLICATIONS

Machine translation of DE 102006010694 A1. Obtained from http://www.epo.org/searching-for-patents/technical/espacenet.html on Feb. 12, 2016.*

(Continued)

*Primary Examiner* — Fred E Finch, III
(74) *Attorney, Agent, or Firm* — Renner, Otto, Boisselle & Sklar, LLP

(57) ABSTRACT

An inverter device (1), including a first inverter (10), and a second inverter (20) connected in parallel to the first inverter. Both the first and second inverters (10, 20) are three-level inverters. The first and second inverters (10, 20) generate first and second output voltages (V1, V2) using the voltage (Vc) at the connection point between a first capacitor (C1) and a second capacitor (C2) connected in series and evenly allocating a power supply voltage (Vin). A control circuit (40) duty-controls the second inverter at high frequency, when the second inverter (20) switches the level of the second output voltage (V2).

10 Claims, 4 Drawing Sheets

(51) Int. Cl.
*H02M 7/5395* (2006.01)
*H02M 7/5387* (2007.01)
*H02M 7/493* (2007.01)

(56) References Cited

U.S. PATENT DOCUMENTS

| | | | | |
|---|---|---|---|---|
| 2011/0211381 | A1* | 9/2011 | Iwata | H02M 7/49 363/132 |
| 2012/0057380 | A1* | 3/2012 | Abe | H02M 7/487 363/62 |
| 2013/0051105 | A1* | 2/2013 | Wang | H02M 7/5387 363/132 |
| 2013/0094260 | A1* | 4/2013 | Martini | H02M 7/483 363/97 |
| 2013/0107589 | A1* | 5/2013 | Tanaka | H02M 7/49 363/65 |

FOREIGN PATENT DOCUMENTS

| | | |
|---|---|---|
| DE | 102006010694 A1 | 9/2007 |
| EP | 0 874 448 A1 | 10/1998 |
| EP | 2584692 A2 * | 4/2013 .......... H02M 7/5387 |
| JP | 08-182342 A | 7/1996 |
| JP | H09-233839 A | 9/1997 |
| JP | 2002-199738 A | 7/2002 |
| JP | 2004-254447 A | 9/2004 |
| JP | 2006-191743 A | 7/2006 |
| JP | 2007-124731 A | 5/2007 |
| JP | 3967706 B2 | 6/2007 |
| JP | 2010-075022 A | 4/2010 |
| JP | 2010-183670 A | 8/2010 |
| JP | 2011-004464 A | 1/2011 |
| JP | 2011-061950 A | 3/2011 |
| WO | WO 97/25766 A1 | 7/1997 |
| WO | WO 2010/058536 A1 | 5/2010 |

OTHER PUBLICATIONS

International Preliminary Report on Patentability for corresponding International Application No. PCT/JP2012/007320 mailed Jun. 3, 2014.

International Search Report for corresponding International Application No. PCT/JP2012/007320 mailed Feb. 19, 2013.

Extended European Search Report for corresponding European Application No. EP 12 85 4286 dated Jun. 18, 2015.

* cited by examiner

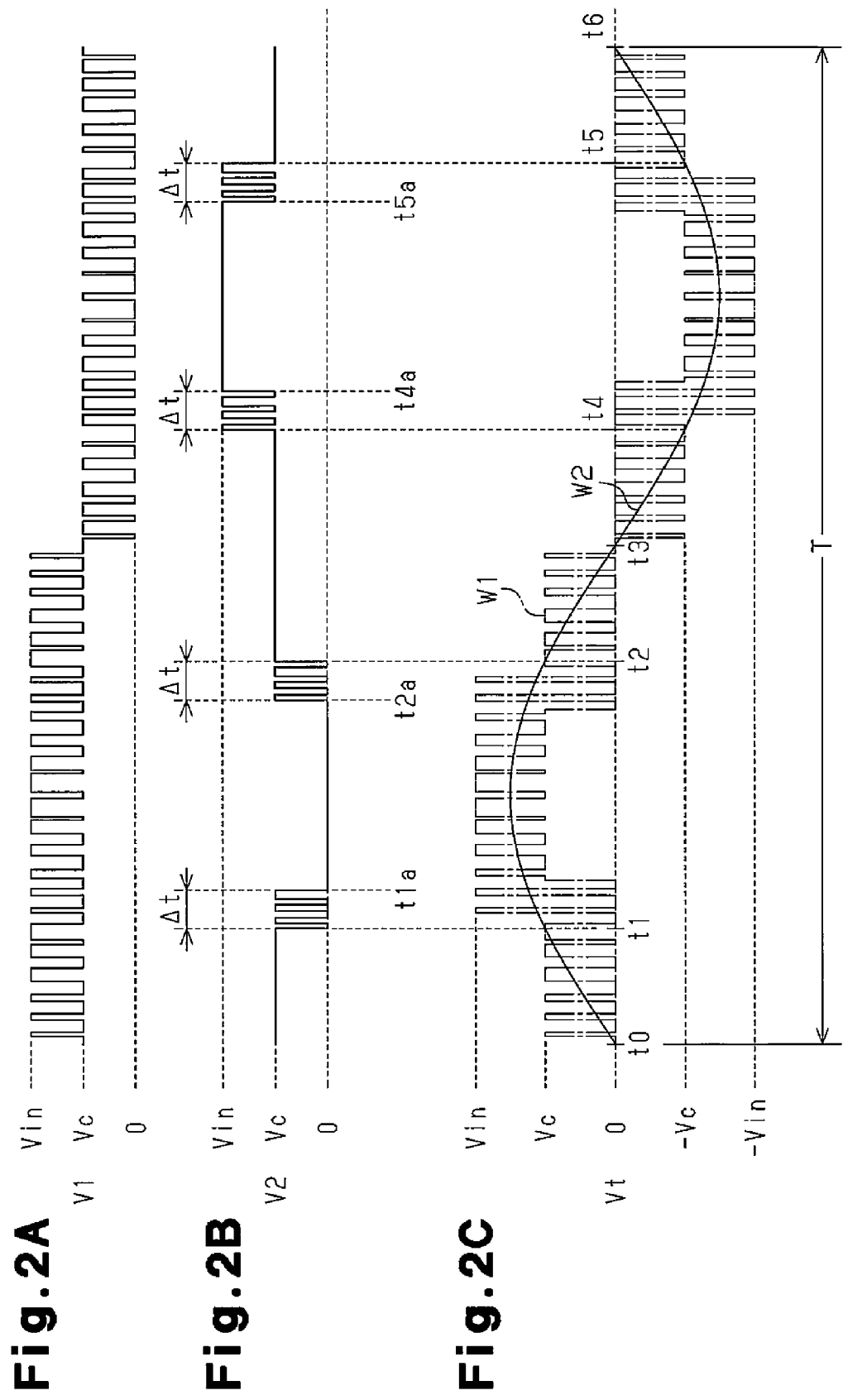

CONTROL METHOD FOR INVERTER DEVICE, AND INVERTER DEVICE

TECHNICAL FIELD

The present invention relates to a control method for an inverter device and to an inverter device.

BACKGROUND ART

Nowadays, inverter devices that include multi-level inverters are widely used in inverter motors and power conditioners of solar power generation systems (e.g., patent document 1). In particular, a three-level inverter uses switching elements having a lower withstand voltage than those of a two-level inverter.

A three-level inverter includes four switching elements, which are connected in series, and two clamping diodes, which are connected in series. The series circuit of the four switching elements is connected in parallel to two capacitors, which are connected in series and divide the voltage of a DC power supply. Among the four switching elements, the two switching elements at the positive electrode side are referred to as switching elements of an upper arm, and the two switching elements at the negative electrode side are referred to as switching elements of a lower arm.

A connection point of the two clamping diodes is connected to a connection point of the two capacitors. A cathode terminal of the positive electrode side clamping diode is connected to a connection point of the two switching elements in the upper arm. An anode terminal of the negative electrode side clamping diode is connected to a connection point of the two switching elements in the lower arm.

The four switching elements are switched on and off so that the inverter device generates three levels of output voltages at a connection point of the upper arm and the lower arm.

An inverter device including two three-level inverters that are connected in parallel has also been proposed. The inverter device supplies a filter circuit with two three-level output voltages that are output from a connection point of an upper arm and a lower arm of the two three-level inverters. Then, the filter circuit combines the two three-level output voltages to form a sine wave.

PRIOR ART DOCUMENTS

Patent Document

Patent Document 1: Japanese Laid-Open Patent Publication No. 2002-199738

SUMMARY OF THE INVENTION

Problems that are to be Solved by the Invention

Such a three-level inverter receives voltage, which is equally divided by the two capacitors that are connected in series to divide the voltage of the DC power supply, and generates from the voltage a three-level output voltage. Thus, the capacitors need to have a capacitance that is sufficiently large for the output power. This enlarges the capacitors, which, in turn, enlarges the inverter device.

To reduce distortion of the output waveform that occurs when switching the output level in steps, there is a need to enlarge an alternating current (AC) that is arranged in a filter circuit. This results in a shortcoming in which enlargement of the AC reactor enlarges the inverter device.

An inverter device including a plurality of parallel-connected three-level inverters operates one of the three-level inverters with a high frequency and operates another one of the three-level inverters with a lower frequency to use the output difference as an output voltage in order to enlarge the inverter device. This method reduces the size of an AC reactor that smoothens current and decreases the number of times switching is performed in the three-level inverter operated at a low frequency. Thus, the switching loss may be decreased and the operation efficiency of the inverter device may be increased.

However, in the inverter device described above, a distortion occurs in the output wave when switching the output level in steps. Further, in such type of an inverter device, there is a need to increase the capacitance of the two capacitors that divide the voltage of the DC power supply. This results in enlargement of the capacitors, which, in turn, enlarges the inverter device.

Accordingly, it is an object of the present invention to provide a control method for an inverter device and to provide an inverter device that allows for high efficiency and reduction in size while reducing distortion in the output waveform.

Means for Solving the Problem

To solve the above problem, a first aspect of the present invention provides a method for controlling an inverter device. The inverter device includes a first inverter capable of generating a first output voltage having a plurality of levels, a second inverter connected in parallel to the first inverter and capable of generating a second output voltage having a plurality of levels, a filter circuit that combines the first output voltage and the second output voltage and generates an output voltage having a sine waveform, and a control circuit that controls the first inverter and the second inverter to generate a first output voltage having a plurality of levels with the first inverter and generate a second output voltage having a plurality of levels with the second inverter so that the filter circuit generates an output voltage having a predetermined sine waveform. The method includes duty-controlling the first inverter at a high frequency with the control circuit to switch the level of the first output voltage, and controlling the second inverter with the control circuit to switch the level of the second output voltage. The controlling the second inverter includes duty-controlling the second inverter at a high frequency when the second inverter switches the level of the second output voltage.

Preferably, the method includes stopping the duty control of the first inverter that is duty-controlled at the high frequency when the second inverter is duty-controlled at a high frequency with the control circuit.

Preferably, in the method, each of the first and second inverters is a three-level inverter and connected to a connection point between a first capacitor and a second capacitor that are connected in series and equally divide DC voltage. Further, the method includes generating the first and second output voltages having three levels using the voltage at the connection point with the first and second inverters.

Further, to solve the above problem, a second aspect of the present invention provides an inverter device including a first inverter capable of generating a first output voltage having a plurality of levels, a second inverter connected in parallel to the first inverter and capable of generating a second output voltage having a plurality of levels, and a filter circuit connected to the first inverter and the second inverter. The filter circuit combines the first output voltage and the second output voltage and generates an output voltage having a sine waveform. A control circuit controls the first inverter and the second inverter to generate a first output voltage having a plurality of levels with the first inverter and generate a second output voltage having a plurality of levels with the second inverter so that the filter circuit generates an output voltage having a predetermined sine waveform. The control circuit duty-controls the first inverter at a high frequency to switch the level of the first output voltage and controls the second inverter to switch the level of the second output voltage. The control circuit duty-controls the second inverter at a high frequency when the second inverter switches the level of the second output voltage.

Preferably, in the inverter device, the control circuit stops the duty control of the first inverter that is duty-controlled at the high frequency when the second inverter is duty-controlled at a high frequency.

Preferably, in the inverter device, the control circuit includes a first control mode that duty-controls the first inverter at a high frequency when the second inverter is duty-controlled at a high frequency, and a second control mode that stops duty-controlling the first inverter when the second inverter is duty-controlled at a high frequency.

Preferably, the inverter device includes a first capacitor and a second capacitor connected in series. The first capacitor and the second capacitor equally divide DC voltage. Each of the first and second inverters is a three-level inverter and connected to a connection point between the first capacitor and the second capacitor. The first and second inverters generate the first and second output voltages having three levels using the voltage at the connection point.

Preferably, the inverter device includes a first capacitor and a second capacitor connected in series. The first capacitor and the second capacitor equally divide DC voltage. The control circuit switches a control mode to one of the first control mode and the second control mode based on voltage at a connection point between the first capacitor and the second capacitor.

Preferably, in the inverter device, the control circuit starts duty-controlling the second inverter at a high frequency based on voltage at the connection point between the first capacitor and the second capacitor and stops duty controlling the first inverter when the second inverter is duty-controlled at a high frequency.

Preferably, in the inverter device, each of the first and second inverters includes a first series circuit, including four series-connected switching elements, and a second series circuit, including two series-connected clamping diodes. The four switching elements include two switching elements at an upper arm side and two switching elements at a lower arms side. The two clamping diodes include a clamping diode at an upper arm side and a clamping diode at a lower arm side. The upper arm side clamping diode includes a cathode terminal connected to a connection node between the two upper arm side switching elements, and the lower arm side clamping diode includes an anode terminal connected to a connection node between the two lower arm side switching elements. The connection node between the first capacitor and the second capacitor is connected to a connection node between the two clamping diodes, and the filter circuit is connected to a connection node between the two upper arm side switching elements and the two lower side switching elements.

Effect of the Invention

The present invention provides an inverter device that allows for high efficiency and reduction in size while reducing distortion in the output waveform.

BRIEF DESCRIPTION OF THE DRAWINGS

FIG. 2 is a waveform chart illustrating the operation of the inverter device according to the first embodiment of the present invention, in which FIG. 2(a) is a waveform chart of a first output voltage of a first inverter, FIG. 2(b) is a waveform chart of a second output voltage of a second inverter, and FIG. 2(c) is a waveform chart of an output voltage of the inverter device.

FIG. 3 is a waveform chart illustrating the operation of an inverter device according to a second embodiment of the present invention, in which

EMBODIMENTS OF THE INVENTION

First Embodiment

An inverter device according to a first embodiment of the present invention will now be described with reference to the drawings.

Figure 1:
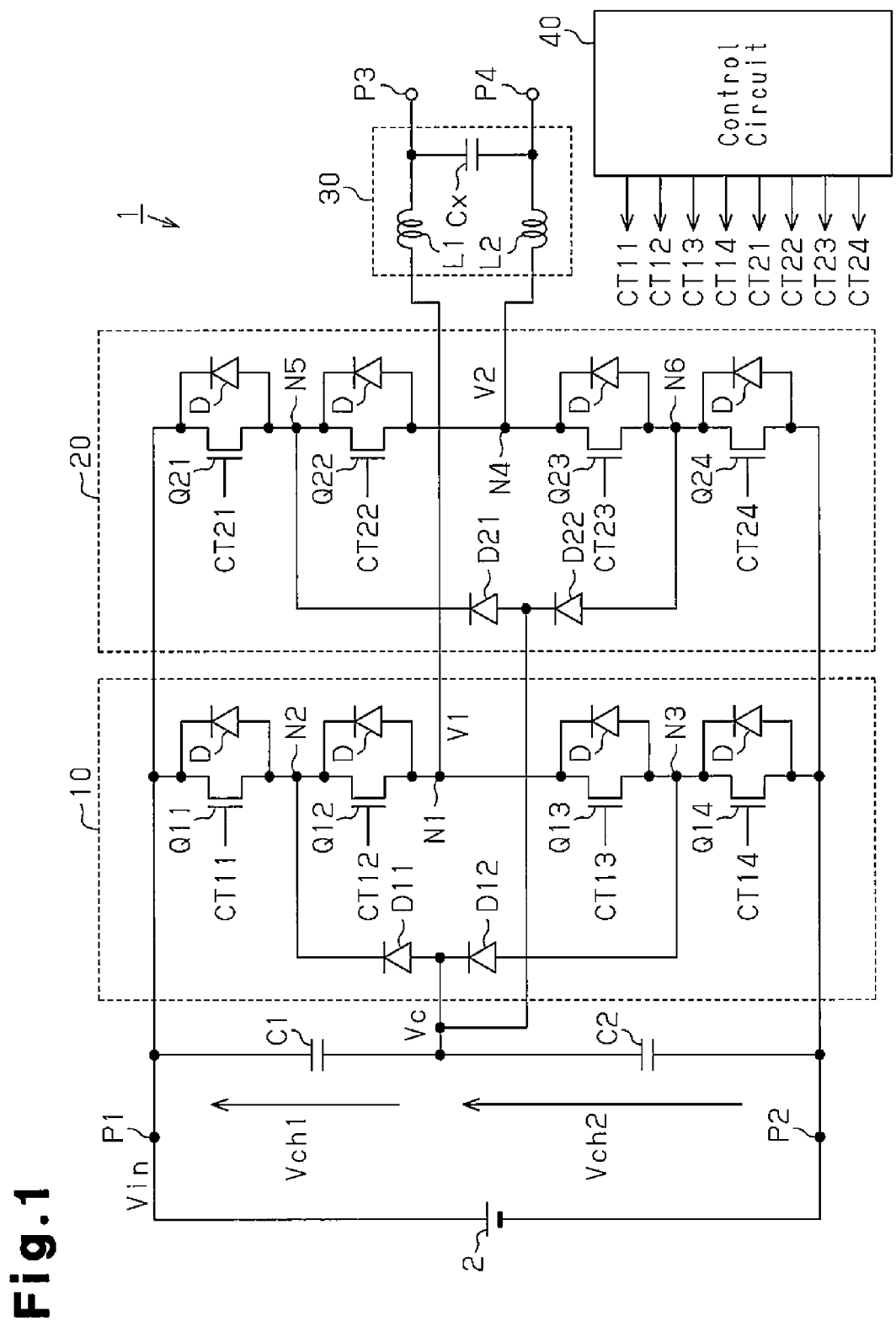
FIG. 1 is an electric circuit diagram of an inverter device according to a first embodiment of the present invention.

Referring to FIG. 1, an inverter device 1 includes a first inverter 10 and a second inverter 20. The first inverter 10 and the second inverter 20 are connected in parallel and form a parallel circuit. The parallel circuit is connected between a positive electrode output terminal P1 and a negative electrode output terminal P2 of a DC power supply 2, which generates power supply voltage Vin.

A series circuit of a first capacitor C1 and a second capacitor C2, which have the same capacitance, are connected between the positive electrode output terminal P1 and the negative electrode output terminal P2. The series circuit of the first and second capacitors C1 and C2 is connected in series to the DC power supply 2 so that one of the terminals of the first capacitor C1 is connected to the positive electrode output terminal P1 and one of the terminals of the second capacitor C2 is connected to the negative electrode output terminal P2. The first capacitor C1 and the second capacitor C2 have the same capacitance. Thus a first inter-terminal voltage Vch1 of the first capacitor C1 and a second inter-terminal voltage Vch2 of the second capacitor C2 are each equal to one half of the power supply voltage Vin of the DC power supply 2 (Vin/2).

In other words, based on the connection point of the first capacitor C1 and the second capacitor C2, each of the first capacitor C1 and the second capacitor C2 handles one half of the power supply voltage Vin of the DC power supply (Vin/2). One half of the power supply voltage Vin will hereafter be referred to as the input voltage Vc.

First Inverter 10

The first inverter 10 is a three-level inverter and includes first, second, third, and fourth switching elements Q11, Q12, Q13, and Q14. Each of the switching elements Q11 to Q14 is formed by an N-channel MOS transistor. A body diode D is connected between the source and drain of each MOS transistor. In the first embodiment, each of the switching elements Q11 to Q14 is embodied in a MOS transistor but may be embodied in a different switching element such as an insulated gate bipolar transistor (IGBT) connected in parallel to a diode to generate commutation current.

The first to fourth switching elements Q11 to Q14 are connected in series in the order of the first switching element Q11, the second switching element Q12, the third switching element Q13, and the fourth switching element Q14. The first switching element Q11 is connected to the positive electrode output terminal P1. The first to fourth switching elements Q11 to Q14 are connected in series so that the drain terminals are located at the side of the positive electrode output terminal P1 and the source terminals are located at the side of the negative electrode terminal P2.

Among the four first to fourth switching elements Q11 to Q14, the first and second switching elements Q11 and Q12 at the positive electrode side are referred to as switching elements of the upper arm. Further, the third and fourth switching elements Q13 and Q14 at the negative electrode side are referred to as the switching elements of the lower arm. A connection point (node N1) of the second switching element Q12 of the upper arm and the third switching element Q13 of the lower arm forms an output terminal. The output terminal (node N1) is connected to a filter circuit 30.

The gate terminal of the first switching element Q11 is provided with a first drive signal CT11. The first switching element Q11 is switched on when the first drive signal CT11 has a high level and switched off when the first drive signal CT11 has a low level.

The gate terminal of the second switching element Q12 is provided with a second drive signal CT12. The second switching element Q12 is switched on when the second drive signal CT12 has a high level and switched off when the second drive signal CT12 has a low level.

The gate terminal of the third switching element Q13 is provided with a third drive signal CT13. The third switching element Q13 is switched on when the third drive signal CT13 has a high level and switched off when the third drive signal CT13 has a low level.

The gate terminal of the fourth switching element Q14 is provided with a fourth drive signal CT14. The fourth switching element Q14 is switched on when the fourth drive signal CT14 has a high level and switched off when the fourth drive signal CT14 has a low level.

The first inverter 10 includes a first clamping diode D11 and a second clamping diode D12. The first clamping diode D11 and the second clamping diode D12 are connected in series.

The first clamping diode D11 includes a cathode terminal, which is connected to a connection point (node N2) of the first switching element Q11 and the second switching element Q12 of the upper arm, and an anode terminal, which is connected to the cathode terminal of the second clamping diode D12. The second clamping diode D12 includes a cathode terminal, which is connected to the anode terminal of the first clamping diode D11, and an anode terminal, which is connected to a connection point (node N3) of the third switching element Q13 and the fourth switching element Q14 of the lower arm.

A connection point of the first clamping diode D11 and the second clamping diode D12 is connected to a connection point of the first capacitor C1 and the second capacitor C2. Accordingly, input voltage Vc (Vin/2) from the connection point of the first capacitor C1 and the second capacitor C2 is applied to the connection point of the first clamping diode D11 and the second clamping diode D12.

The first inverter 10 switches the first to fourth switching elements Q11 to Q14 on and off to generate, at the output terminal (node N1), a first output voltage V1 in the three steps of zero volts, input voltage Vc, and power supply voltage Vin.

More specifically, when the first and second switching elements Q11 and Q12 are off and the third and fourth switching elements Q13 and Q14 are on, the first output voltage V1 generated at the output terminal (node N1) is zero volts.

When the first and fourth switching elements Q11 and Q14 are off and the second and third switching elements Q12 and Q13 are on, the first output voltage V1 generated at the output terminal (node N1) is the same as the input voltage Vc.

When the first and second switching elements Q11 and Q12 are on and the third and fourth switching elements Q13 and Q14 are off, the first voltage V1 generated at the output terminal (node N1) is the same as the power supply voltage Vin.

Second Inverter 20

The second inverter 20 is a three-level inverter and includes fifth, sixth, seventh, and eighth switching elements Q21, Q22, Q23, and Q24. Each of the switching elements Q21 to Q24 is formed by an N-channel MOS transistor. A body diode D is connected between the source and drain of each MOS transistor. In the first embodiment, each of the switching elements Q21 to Q24 is embodied in a MOS transistor but may be embodied in a different switching element such as an insulated gate bipolar transistor (IGBT) connected in parallel to a diode to generate commutation current.

The fifth to eighth switching elements Q21 to Q24 are connected in series in the order of the fifth switching element Q21, the sixth switching element Q22, the seventh switching element Q23, and the eighth switching element Q24. The fifth switching element Q21 is connected to the positive electrode output terminal P1. The fifth to eighth switching elements Q21 to Q24 are connected in series so that the drain terminals are located at the side of the positive electrode output terminal P1 and the source terminals are located at the side of the negative electrode terminal P2.

Among the four fifth to eighth switching elements Q21 to Q24, the fifth and sixth switching elements Q21 and Q22 at the positive electrode side are referred to as switching elements of the upper arm. Further, the seventh and eighth switching elements Q23 and Q24 at the negative electrode side are referred to as the switching elements of the lower arm. A connection point (node N4) of the sixth switching element Q22 of the upper arm and the seventh switching element Q23 of the lower arm forms an output terminal. The output terminal (node N4) is connected to a filter circuit 30.

The gate terminal of the fifth switching element Q21 is provided with a fifth drive signal CT21. The fifth switching element Q21 is switched on when the fifth drive signal CT21 has a high level and switched off when the fifth drive signal CT21 has a low level.

The gate terminal of the sixth switching element Q22 is provided with a sixth drive signal CT22. The sixth switching element Q22 is switched on when the sixth drive signal CT22 has a high level and switched off when the sixth drive signal CT22 has a low level.

The gate terminal of the seventh switching element Q23 is provided with a seventh drive signal CT23. The seventh switching element Q23 is switched on when the seventh drive signal CT23 has a high level and switched off when the seventh drive signal CT23 has a low level.

The gate terminal of the eighth switching element Q24 is provided with an eighth drive signal CT24. The eighth switching element Q24 is switched on when the eighth drive signal CT24 has a high level and switched off when the eighth drive signal CT24 has a low level.

The second inverter 20 includes a third clamping diode D21 and a fourth clamping diode D22. The third clamping diode D21 and the fourth clamping diode D22 are connected in series.

The third clamping diode D21 includes a cathode terminal, which is connected to a connection point (node N5) of the fifth switching element Q21 and the sixth switching element Q22 of the upper arm, and an anode terminal, which is connected to the cathode terminal of the fourth clamping diode D22. The fourth clamping diode D22 includes a cathode terminal, which is connected to the anode terminal of the third clamping diode D21, and an anode terminal, which is connected to a connection point (node N6) of the seventh switching element Q23 and the eighth switching element Q24 of the lower arm.

A connection point of the third clamping diode D21 and the fourth clamping diode D22 is connected to a connection point of the first capacitor C1 and the second capacitor C2. Accordingly, input voltage Vc (Vin/2) from the connection point of the first capacitor C1 and the second capacitor C2 is applied to the connection point of the third clamping diode D21 and the fourth clamping diode D22.

The second inverter 20 switches the fifth to eighth switching elements Q21 to Q24 on and off to generate, at the output terminal (node N4), a second output voltage V2 in the three steps of zero volts, input voltage Vc, and power supply voltage Vin.

More specifically, when the fifth and sixth switching elements Q21 and Q22 are off and the seventh and eighth switching elements Q23 and Q24 are on, the second output voltage V2 generated at the output terminal (node N4) is zero volts.

When the fifth and eighth switching elements Q21 and Q24 are off and the sixth and seventh switching elements Q22 and Q23 are on, the second output voltage V2 generated at the output terminal (node N4) is the same as the input voltage Vc.

When the fifth and sixth switching elements Q21 and Q22 are on and the seventh and eighth switching elements Q23 and Q24 are off, the second voltage V2 generated at the output terminal (node N4) is the same as the power supply voltage Vin.

The first output voltage V1 generated by the first inverter 10 and the second output voltage V2 generated by the second inverter 20 are supplied to the filter circuit 30.

Filter Circuit 30

The filter circuit 30 combines the first output voltage V1, which is shown in FIG. 2(a) and supplied from the first inverter 10, and the second output voltage V2, which is shown in FIG. 2(b) and supplied from the second inverter 20, to generate an output voltage Vt, which is shown in FIG. 2(c). The filter circuit 30 filters a combined waveform W1, which is shown by the dashed line in FIG. 2(c) and which is the difference of the first output voltage V1 and the second output voltage V2, to supply an output voltage Vt (V1−V2), which has a sine waveform W2 and which is shown by the solid line in FIG. 2(c).

The filter circuit 30 includes a first AC reactor L1, a second AC reactor L2, and a smoothing capacitor Cx. The first AC reactor L1 is connected between the output terminal (node N1) of the first inverter 10 and a first output terminal P3. The second AC reactor L2 is connected between the output terminal (node N4) of the second inverter 20 and a second output terminal P4. The smoothing capacitor Cx is connected between the first output terminal P3 and the second output terminal P4.

The first output voltage V1 from the first inverter 10 is applied to the first AC reactor L1, and the second output voltage V2 from second inverter 20 is applied to the second AC reactor L2. The filter circuit 30 combines the first output voltage V1 and the second output voltage V2 and supplies the output voltage having the sine waveform W2 shown in FIG. 2(c) from between the first and second output terminals P3 and P4.

The inverter device 1 includes a control circuit 40.

The control circuit 40 generates, from between the first and second output terminals P3 and P4 of the filter circuit 30, the first to eighth drive signals CT11 to CT14 and CT21 to CT24 to supply the output voltage Vt of the sine waveform W2 shown in FIG. 2(c).

The control circuit 40 switches the first to fourth switching elements Q11 to Q14 of the first inverter 10 on and off at a high frequency to generate the first to fourth drive signals CT11 to CT14, which are used to supply the first output voltage V1 having three levels from the first inverter 10.

In detail, as shown in FIG. 2(a), to generate the output voltage Vt of the sine waveform W2, in a former half of a single cycle T, the control circuit 40 generates the first to fourth drive signals CT11 to CT14 to duty-control the first output voltage V1 between the input voltage Vc and the power supply voltage Vin. Further, to generate the output voltage Vt of the sine waveform W2, in the remaining latter half of a cycle, the control circuit 40 generates the first to fourth drive signals CT11 to CT14 to duty-control the first output voltage V1 between zero volts and the input voltage Vc.

In the first embodiment, a single cycle T of the output voltage Vt of the sine waveform W2 is from time t0 to time t6, which are predetermined. Time t0 to t6 are obtained in advance theoretically or through experiments, tests, and the like from the sine waveform W2 of the output voltage Vt shown in FIG. 2 supplied to a load (not shown) connected to the filter circuit 30. The time corresponding to one half of a cycle of the sine waveform W2 is time t3 (t6/2).

The control circuit 40 controls the first inverter 10 to duty-control the first output voltage V1 with a high frequency so that the first output voltage V1 of the first inverter 10 is combined with the second output voltage V2 of the second inverter 20 to generate the output voltage Vt of the predetermined sine waveform W2. As shown in FIG. 2(a), in the period of time t0 to t3, the control circuit 40 controls the first inverter 10 to duty-control the first output voltage V1 between the input voltage Vc and the power supply voltage Vin. Further, in the period of time t3 to t6, the control circuit 40 controls the first inverter 10 to duty-control the first output voltage V1 between zero volts and the input voltage Vc.

The duty control of the first inverter 10 in the period of time t0 to t6 is high-frequency duty control.

In the first embodiment, a duty control pattern of the first inverter 10 is set for each situation. The pattern is obtained in advance theoretically or through experiments, tests, and the like so that the output voltage Vt supplied to a load connected to the filter circuit 30 has the sine waveform W2 shown in FIG. 2(c). The data of the pattern is stored in a memory of the control circuit 40.

In the first embodiment, duty control is performed in a predetermined pattern. The duty control may also be performed so that the output voltage Vt has the predetermined sine waveform W2, which is shown by the solid line in FIG. 2(c), by monitoring and feeding back the present output voltage Vt.

The control circuit 40 controls the second inverter 20 to switch the level of the second output voltage V2 in three steps at a predetermined timing during a single cycle T so as to combine the first output voltage V1 of the first inverter 10 and the second output voltage V2 of the second inverter 20 and output the output voltage Vt of the sine waveform W2.

The control circuit 40 controls the second inverter 20 to generate the three types of the second output voltage V2, which are zero volts, the input voltage Vc, and the power supply voltage Vin. The level switching of the second output voltage V2 is performed at a timing at which the output voltage Vt having the sine waveform W2 approaches (passes) +V and −V.

The timing for switching the level of the second output voltage V2 is set as described below. As shown in FIG. 2(c), with regard to the sine waveform W2 of the output voltage Vt, a single cycle T is set from time t0 to time t6 (i.e., T=t6−t0) and one half of a cycle is set from time t0 to time t3 (i.e., T/2=t3−t0).

At time t1, the output voltage Vt of the sine waveform W2 passes the level of the input voltage Vc directed toward the maximum value.

At time t2, the output voltage Vt of the sine waveform W2 passes the level of the input voltage Vc directed toward zero volts.

At time t4, the output voltage Vt of the sine waveform W2 passes the level of the negative input voltage −Vc directed toward the minimum value.

At time t5, the output voltage Vt of the sine waveform W2 passes the level of the negative input voltage −Vc directed toward zero volts.

Immediately before and after times t1, t2, t4, and t5, the output voltage Vt of the sine waveform W2 cannot be generated with only the duty control of the first inverter 10. Thus, when switching the level of the second output voltage V2, the second inverter 20 is also duty-controlled to generate the output voltage Vt of the sine waveform W2. The duty control of the second inverter 20 is high-frequency duty control.

More specifically, the control circuit 40 combines the second output voltage V2 of the second inverter 20 with the first output voltage V1 of the first inverter 10 to duty-control the second inverter 20 so that the output voltage Vt supplied from the filter circuit 30 has the predetermined sine waveform W2.

In the first embodiment, a high-frequency duty control pattern is set for the second inverter 20. The pattern is obtained in advance theoretically or through experiments, tests, and the like so that the output voltage Vt supplied to a load connected to the filter circuit 30 has the sine waveform W2 shown in FIG. 2(c). The data of the pattern is stored in the memory of the control circuit 40.

In detail, as shown in FIG. 2(b), at time t1, time t2, time t4, and time t5 in a single cycle T set from time t0 to t6, a predetermined time width Δt is set based on each time. The control circuit 40 operates the fifth to eighth switching elements Q21 to Q24 at a high frequency with the predetermined time width Δt, which is set based on each of the times T1, t2, t4, and t5. Then, the control circuit 40 switches the level of the second output voltage V2.

The time width Δt is obtained in advance theoretically or through experiments, tests, and the like so that the output voltage Vt of the filter circuit 30 has the sine waveform W2 shown in FIG. 2(c) for the load connected to the filter circuit 30.

From time t0 to t1, the control circuit 40 generates the fifth to eighth drive signals CT21 to CT24 to maintain the second output voltage V2 at the input voltage Vc. Then, from time t1 to t1a (t1+Δt), the control circuit 40 generates the fifth to eighth drive signals CT21 to CT24 to duty-control the second output voltage Vt at a high frequency between zero volts and the input voltage Vc.

From time t1a to t2a (t2−Δt), the control circuit 40 generates the fifth to eighth drive signals CT21 to CT24 to maintain the second output voltage V2 at zero volts. Then, from time t2a to t2, the control circuit 40 generates the fifth to eighth drive signals CT21 to CT24 to duty-control the second output voltage Vt at a high frequency between zero volts and the input voltage Vc.

From time t2 to t4a (t4−Δt), the control circuit 40 generates the fifth to eighth drive signals CT21 to CT24 to maintain the second output voltage V2 at the input voltage Vc. Then, from time t4a to t4, the control circuit 40 generates the fifth to eighth drive signals CT21 to CT24 to duty-control the second output voltage Vt at a high frequency between the input voltage Vc and the power supply voltage Vin.

From time t4 to t5a (t4−Δt), the control circuit 40 generates the fifth to eighth drive signals CT21 to CT24 to maintain the second output voltage V2 at the power supply voltage Vin. Then, from time t5a to t5, the control circuit 40 generates the fifth to eighth drive signals CT21 to CT24 to duty-control the second output voltage Vt at a high frequency between the input voltage Vc and the power supply voltage Vin.

Finally, from time t5 to t6, the control circuit 40 generates the fifth to eighth drive signals CT21 to CT24 to maintain the second output voltage V2 at the input voltage Vc.

The first output voltage V1 of the first inverter 10 and the second output voltage V2 of the second inverter 20 are supplied to the filter circuit 30. Thus, the output voltage Vt, which is generated between the first and second output terminals P3 and P4 of the filter circuit 30, is equal to the difference of the first output voltage V1 and the second output voltage V2. As a result, as shown in FIG. 2(c), the output voltage Vt (V1−V2) has the sine waveform W2.

First Inverter 10

Time t0 to t3

Here, from time t0 to t3, the control circuit 40 duty-controls the first to fourth switching elements Q11 to Q14 of the first inverter 10 at a high frequency to generate the first output voltage V1, which is duty-controlled at a level between the input voltage Vc and the power supply voltage Vin.

More specifically, from time t0 to t3, the second switching element Q12 remains on and the fourth switching element Q14 remains off. Further, the first switching element Q11 and the third switching element Q13 are switched on and off in a complementary manner.

When the first switching element Q11 is switched off and the third switching element Q13 is switched on, the first output voltage V1 is equal to the input voltage Vc. On the other hand, when the first switching element Q11 is switched on and the third switching element Q13 is switched off, the first output voltage V1 is equal to the power supply voltage Vin.

Time t3 to t6

From time t3 to t6, the control circuit 40 duty-controls the first to fourth switching elements Q11 to Q14 at a frequency in the first inverter 10 to generate the first output voltage V1, which is duty-controlled at a level between zero volts and the input voltage Vc.

More specifically, from time t3 to t6, the first switching element Q11 remains off and the third switching element Q13 remains on. Further, the second switching element Q12 and the fourth switching element Q14 are switched on and off in a complementary manner.

When the second switching element Q12 is switched off and the fourth switching element Q14 is switched on, the first output voltage V1 is zero volts. On the other hand, when the second switching element Q12 is switched on and the fourth switching element Q14 is switched off, the first output voltage V1 is equal to the input voltage Vc.

In this manner, the control circuit 40 sets time t0 to t6 as a single cycle T, repetitively drive-controls the first to fourth switching elements Q11 to Q14 of the first inverter 10, and repetitively supplies the filter circuit 30 with the first output voltage V1 of the waveform shown in FIG. 2(a).

Second Inverter 20

Time t0 to t1

From time t0 to t1, the control circuit 40 generates the second output voltage V2 that is equal to the input voltage Vc with the second inverter 20.

More specifically, from time t0 to t1, the control circuit 40 keeps the fifth and eighth switching elements Q21 and Q24 switched off and the sixth and seventh switching elements Q22 and Q23 switched on.

Time t1 to t1a

From time t1 to t1a (t1a−t1=Δt), the control circuit 40 duty-controls the fifth to eighth switching elements Q21 to Q24 of the second inverter 20 at a high frequency. This generates the second output voltage V2 that is duty-controlled at a level between zero volts and the input voltage Vc.

More specifically, from time t1 to t1a, the fifth switching element Q21 remains off and the seventh switching element Q23 remains on. Further, the sixth switching element Q22 and the eighth switching element Q24 are switched on and off in a complementary manner.

When the sixth switching element Q22 is switched off and the eighth switching element Q24 is switched on, the second output voltage V2 is zero volts. On the other hand, when the sixth switching element Q22 is switched on and the eighth switching element Q24 is switched off, the second output voltage V2 is equal to the input voltage Vc.

In this manner, in addition to duty-controlling the first inverter 10, the second inverter 20 is also duty-controlled. Thus, even when the second output voltage V2 is switched, the output voltage Vt gradually passes the input voltage Vc without distortion in the sine waveform W2 of the output voltage Vt.

Time t1a to t2a

From time t1a to t2a, the control circuit 40 generates the second output voltage V2 that is zero volts with the second inverter 20. More specifically, from time t1a to t2a, the control circuit 40 keeps the fifth and sixth switching elements Q21 and Q22 switched off and the seventh and eighth switching elements Q23 and Q24 switched on.

Time t2a to t2

From time t2a to t2 (t2−t2a=Δt), the control circuit 40 duty-controls the fifth to eighth switching elements Q21 to Q24 of the second inverter 20 at a high frequency. This generates the second output voltage V2 that is duty-controlled at a level between zero volts and the input voltage Vc.

More specifically, from time t2a to t2, the fifth switching element Q21 remains off and the seventh switching element Q23 remains on. Further, the sixth switching element Q22 and the eighth switching element Q24 are switched on and off in a complementary manner.

When the sixth switching element Q22 is switched off and the eighth switching element Q24 is switched on, the second output voltage V2 is zero volts. On the other hand, when the sixth switching element Q22 is switched on and the eighth switching element Q24 is switched off, the second output voltage V2 is equal to the input voltage Vc.

In this manner, in addition to duty-controlling the first inverter 10, the second inverter 20 is also duty-controlled. Thus, even when the second output voltage V2 is switched, the output voltage Vt gradually passes the input voltage Vc without distortion in the sine waveform W2 of the output voltage Vt.

Time t2 to t4

From time t2 to t4, the control circuit 40 generates the second output voltage V2 that is equal to the second output voltage with the second inverter 20. More specifically, from time t2 to t4a, the control circuit 40 keeps the fifth and eighth switching elements Q21 and Q24 switched off and the sixth and seventh switching elements Q22 and Q23 switched on.

Time t4 to t4a

From time t4 to t4a (t4a−t4=Δt), the control circuit 40 duty-controls the fifth to eighth switching elements Q21 to Q24 of the second inverter 20 at a high frequency. This generates the second output voltage V2 that is duty-controlled at a level between the input voltage Vc and the power supply voltage Vin.

More specifically, from time t4 to t4a, the sixth switching element Q22 remains on and the eighth switching element Q23 remains off. Further, the fifth switching element Q21 and the seventh switching element Q23 are switched on and off in a complementary manner.

When the fifth switching element Q21 is switched off and the seventh switching element Q23 is switched on, the second output voltage V2 is equal to the input voltage Vc. On the other hand, when the fifth switching element Q21 is switched on and the seventh switching element Q23 is switched off, the second output voltage V2 is equal to the power supply voltage Vin.

In this manner, in addition to duty-controlling the first inverter 10, the second inverter 20 is also duty-controlled. Thus, even when the second output voltage V2 is switched, the output voltage Vt gradually passes the input voltage −Vc without distortion in the sine waveform W2 of the output voltage Vt.

Time t4a to t5a

From time t4a to t5a, the control circuit 40 generates the second output voltage V2 that is equal to the power supply voltage Vin with the second inverter 20. More specifically, from time t4 to t5a, the control circuit 40 keeps the fifth and sixth switching elements Q21 and Q22 switched on and the seventh and eighth switching elements Q23 and Q24 switched off.

Time t5a to t5

From time t5a to t2 (t5−t2a=Δt), the control circuit 40 duty-controls the fifth to eighth switching elements Q21 to Q24 of the second inverter 20 at a high frequency. This generates the second output voltage V2 that is duty-controlled at a level between the input voltage Vc and the power supply voltage Vin.

More specifically, from time t5a to t2, the sixth switching element Q22 remains on and the eighth switching element Q24 remains off. Further, the fifth switching element Q21 and the seventh switching element Q23 are switched on and off in a complementary manner.

When the fifth switching element Q21 is switched off and the seventh switching element Q23 is switched on, the second output voltage V2 is equal to the input voltage Vc. On the other hand, when the fifth switching element Q21 is switched on and the seventh switching element Q23 is switched off, the second output voltage V2 is equal to the power supply voltage Vin.

In this manner, in addition to duty-controlling the first inverter 10, the second inverter 20 is also duty-controlled. Thus, even when the second output voltage V2 is switched, the output voltage Vt gradually passes the input voltage −Vc without distortion in the sine waveform W2 of the output voltage Vt.

Time t5 to t6

From time t5 to t6 (t0), the control circuit 40 generates the second output voltage V2 that is equal to the input voltage Vc with the second inverter 20. More specifically, from time t5 to t6, the control circuit 40 keeps the fifth and eighth switching elements Q21 and Q24 switched off and the sixth and seventh switching elements Q22 and Q23 switched on.

In this manner, the control circuit 40 sets time t0 to t6 as a single cycle T, repetitively drive-controls the fifth to eighth switching elements Q21 to Q24 of the second inverter 20, and repetitively supplies the filter circuit 30 with the first output voltage V1 of the waveform shown in FIG. 2(b).

The filter circuit 30 receives and combines the first output voltage V1 and the second output voltage V2. The filter circuit 30 filters the combined waveform W1, which is the difference of the first output voltage V1 and the second output voltage V2 and is shown by the broken lines in FIG. 2(c), to generate the output voltage Vt, which has the sine waveform W2 and is shown by the solid line in FIG. 2(c).

Here, the control circuit 40 operates the fifth to eighth switching elements Q21 to Q24 at a high frequency when switching the level of the second output voltage V2 from one level to another level. This reduces distortion of the sine waveform W2 of the output voltage Vt that occurs when switching levels.

The advantages of the inverter device 1 will now be described.

(1) In the first embodiment, to generate the output voltage Vt of the predetermined sine waveform W2, with respect to the first inverter 10 that is duty-controlled at a high frequency, the second output voltage V2 of the second inverter 20 is switched between the three levels of zero volts, the input voltage Vc, and the power supply voltage Vin. This decrease the number of times the fifth to eighth switching elements Q21 to Q24 are switched in the second inverter 20 and increases the efficiency of the inverter device 1.

(2) In the first embodiment, the second inverter 20 is operated at a high frequency when the level of the second output voltage V2 is switched, which is from time t1 to t1a, time t2a to t2, time t4 to t4a, and time t5a to t5. This reduces and limits distortion in the sine waveform W2 of the output voltage Vt that occurs when the level of the second output voltage V2 drastically changes in steps.

(3) In the first embodiment, the first output voltage V1 of the first inverter 10 is combined with the output voltage V2 of the second inverter 20 to generate five levels of output voltages Vt (V1−V2). More specifically, to form the sine waveform W2, the output voltage Vt is generated in five output levels, which includes the power supply voltage Vin, the input voltage Vc, zero volts, the negative input voltage −Vc, and the negative power supply voltage −Vin. This allows for the first and second reactors L1 and L2 of the filter circuit 30 to be reduced in size. As a result, the inverter device 1 may be reduced in size.

Second Embodiment

An inverter device according to a second embodiment of the present invention will now be described with reference to FIG. 3.

The inverter device of the second embodiment differs from the inverter device of the first embodiment in the control for driving the first to fourth switching elements Q11 to Q14 of the first inverter 10 and the fifth to eighth switching elements Q21 to Q24 of the second inverter 20.

In the inverter device of the second embodiment, the first to eighth switching elements Q11 to Q14 and Q21 to Q24 are drive-controlled to reduce distortion in the output voltage Vt even when the input voltage Vc changes at the connection point of the first capacitor C1 and the second capacitor C2 relative to present changes of the first and second output voltages V1 and V2.

Accordingly, the second embodiment differs from the first embodiment only in how the control circuit 40 controls the first to fourth switching elements Q11 to Q14 of the first inverter 10 and the fifth to eighth switching elements Q21 to Q24 of the second inverter 20. Otherwise, the configuration is basically the same. The description hereafter will center on the difference in the control performed by the control circuit 40 and like portions will not be described in detail.

Figure 3A:
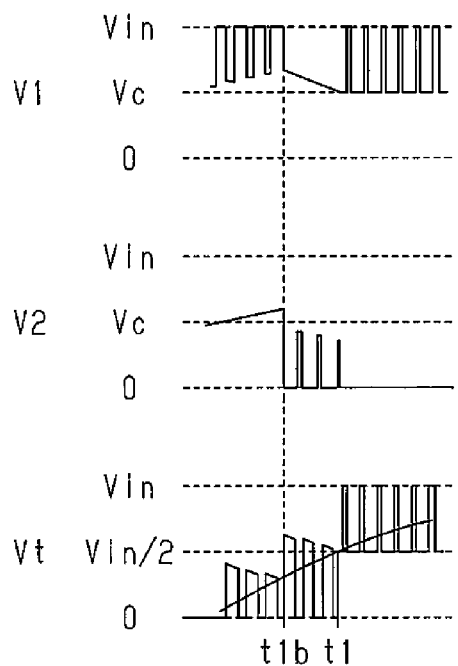
FIG. 3(a) is a voltage waveform chart around time t1.

Time t0 to t1b (refer to FIG. 3(a))

In the same manner as the first embodiment, the control circuit 40 duty-controls the first to fourth switching elements Q11 to Q14 of the first inverter 10 at a high frequency. Further, the control circuit 40 generates the first output voltage V1 that is duty-controlled at a level between the input voltage Vc and the power supply voltage Vin. In the same manner as the first embodiment, the control circuit 40 keeps the fifth and eighth switching elements Q21 and Q24 switched off and the sixth and seventh switching elements Q22 and Q23 switched on. The control circuit 40 generates the second output voltage V2, which is equal to the input voltage Vc, with the second inverter 20.

Here, when the first capacitor C1 and the second capacitor C2 have a small capacitance, the first capacitor C1 is discharged. Thus, as time t1 approaches, the first inter-terminal voltage Vch1 of the first capacitor C1 decreases, and the second inter-terminal voltage Vch2 of the second capacitor C2 increases.

As shown in FIG. 3(a), this gradually decreases the amplitude of the first output voltage V1 of the first inverter 10, which is duty-controlled, and gradually increases the level of the second output voltage V2 of the second inverter 20. As a result, the input voltage Vc of the connection point at the first capacitor C1 and the second capacitor C2 is not one half of the power supply voltage Vin but higher.

Time t1b to t1

When reaching time t1b, the control circuit 40 keeps the first and fourth switching elements Q11 and Q14 switched off and the second and third switching elements Q12 and Q13 switched on to generate the first output voltage V1 that is equal to the input voltage Vc with the first inverter 10. This control is performed until time t1. Further, the control circuit 40 duty-controls the fifth to eighth switching elements Q21 to Q24 of the second inverter 20 at a high frequency to generate the second output voltage V2 that is duty-controlled at a level between zero volts and the input voltage Vc.

This stops discharging the first capacitor C1, discharges the second capacitor C2, decreases the second inter-terminal voltage Vch2 of the second capacitor C2, and increases the first inter-terminal voltage Vch1 of the first capacitor C1. As a result, the input voltage Vc at the connection point of the first capacitor C1 and the second capacitor C2 returns to one half of the power supply voltage Vin (Vin/2).

Figure 3B:
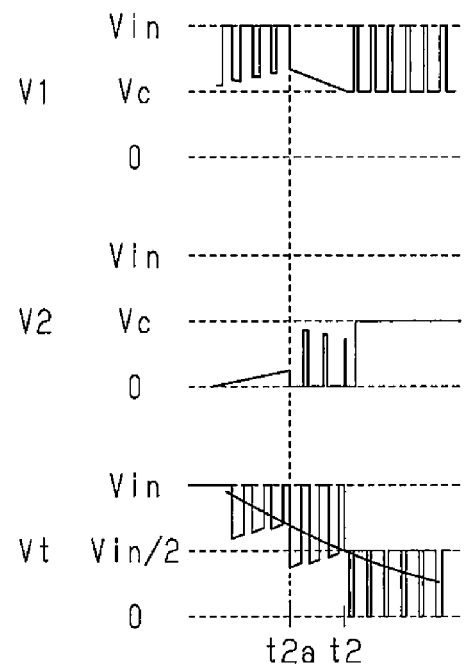
FIG. 3(b) is a voltage waveform chart around time t2.

Time t1 to t2a (refer to FIG. 3(b))

In the same manner as the first embodiment, the control circuit 40 duty-controls the first to fourth switching elements Q11 to Q14 of the first inverter 10 at a high frequency. The control circuit 40 generates the first output voltage V1 that is duty-controlled at a level between the input voltage Vc and the power supply voltage Vin. Further, in the same manner as the first embodiment, the control circuit 40 keeps the fifth and sixth switching elements Q21 and Q22 switched off and the seventh and eighth switching elements Q23 and Q24 switched on. The control circuit 40 generates the second output voltage V2 at zero volts.

Here, when the first capacitor C1 and the second capacitor C2 have a small capacitance, the first capacitor C1 is discharged. Thus, as time t2 approaches, the first inter-terminal voltage Vch1 of the first capacitor C1 decreases, and the second inter-terminal voltage Vch2 of the second capacitor C2 increases.

As shown in FIG. 3(b), this gradually decreases the amplitude of the first output voltage V1 of the first inverter 10, which is duty-controlled, and gradually increases the level of the second output voltage V2 of the second inverter 20. As a result, the input voltage Vc at the connection point of the first capacitor C1 and the second capacitor C2 is not one half of the power supply voltage Vin but higher.

Time t2a to t2

When reaching time t2a, the control circuit 40 keeps the first and fourth switching elements Q11 and Q14 switched off and the second and third switching elements Q12 and Q13 switched on. The control circuit 40 generates the first output voltage V1 that is equal to the input voltage Vc with the first inverter 10. This control is performed until time t2. Further, the control circuit 40 duty-controls the fifth to eighth switching elements Q21 to Q24 of the second inverter 20 at a high frequency. The control circuit 40 generates the second output voltage V2 that is duty-controlled at a level between zero volts and the input voltage Vc.

This stops discharging the first capacitor C1, discharges the second capacitor C2, decreases the second inter-terminal voltage Vch2 of the second capacitor C2, and increases the first inter-terminal voltage Vch1 of the first capacitor C1. As a result, the input voltage Vc at the connection point of the first capacitor C1 and the second capacitor C2 returns to one half of the power supply voltage Vin (Vin/2).

Figure 3C:
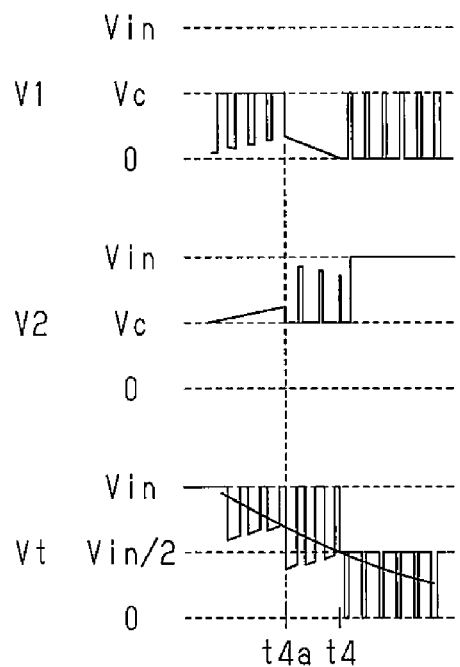
FIG. 3(c) is a voltage waveform chart around time t4.

Time t3 to t4 (refer to FIG. 3(c))

From time t3 to t4, the control circuit 40 duty-controls the first to fourth switching elements Q11 to Q14 of the first inverter 10 at a high frequency. The control circuit 40 generates the first output voltage V1 that is duty-controlled at a level between zero volts and the input voltage Vc. Further, in the same manner as the first embodiment, the control circuit 40 keeps the fifth and eighth switching elements Q21 and Q24 switched off and the sixth and seventh switching elements Q22 and Q23 switched on. The control circuit 40 generates the second output voltage V2 that is equal to the input voltage Vc.

Here, when the first capacitor C1 and the second capacitor C2 have a small capacitance, the first capacitor C1 is discharged. Thus, as time t2a approaches, the first inter-terminal voltage Vch1 of the first capacitor C1 decreases, and the second inter-terminal voltage Vch2 of the second capacitor C2 increases.

As shown in FIG. 3(c), this gradually decreases the amplitude of the first output voltage V1 of the first inverter 10, which is duty-controlled, and gradually increases the level of the second output voltage V2 of the second inverter 20. As a result, the input voltage Vc at the connection point of the first capacitor C1 and the second capacitor C2 is not one half of the power supply voltage Vin but higher.

Time t4 to t4a

When reaching time t4, the control circuit 40 keeps the first and second switching elements Q11 and Q12 switched off and the third and fourth switching elements Q13 and Q14 switched on. The control circuit 40 generates the first output voltage V1 at zero volts with the first inverter 10. This control is performed until time t4. Further, the control circuit 40 duty-controls the fifth to eighth switching elements Q21 to Q24 of the second inverter 20 at a high frequency and generates the second output voltage V2 that is duty-controlled at a level between the input voltage Vc and the power supply voltage Vin.

This stops discharging the first capacitor C1, discharges the second capacitor C2, decreases the second inter-terminal voltage Vch2 of the second capacitor C2, and increases the first inter-terminal voltage Vch1 of the first capacitor C1. As a result, the input voltage Vc at the connection point of the first capacitor C1 and the second capacitor C2 returns to one half of the power supply voltage Vin (Vin/2).

Time t4a to t5a (refer to FIG. 3(c))

From time t4a to t5a, in the same manner as the first embodiment, the control circuit 40 duty-controls the first to fourth switching elements Q11 to Q14 of the first inverter 10 at a high frequency. The control circuit 40 generates the first output voltage V1 that is duty-controlled at a level between zero volts and the input voltage Vc. Further, in the same manner as the first embodiment, the control circuit 40 keeps the fifth and eighth switching elements Q21 and Q24 switched off and the sixth and seventh switching elements Q22 and Q23 switched on. The control circuit 40 generates the second output voltage V2 that is equal to the power supply voltage Vin.

Here, when the first capacitor C1 and the second capacitor C2 have a small capacitance, the first capacitor C1 is discharged. Thus, as time t5a approaches, the first inter-terminal voltage Vch1 of the first capacitor C1 decreases, and the second inter-terminal voltage Vch2 of the second capacitor C2 increases.

Figure 3D:
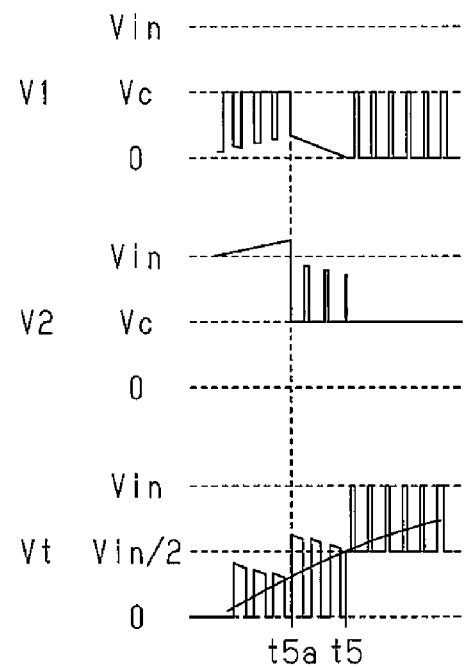
FIG. 3(d) is a voltage waveform chart around time t5.

As shown in FIG. 3(d), this gradually decreases the amplitude of the first output voltage V1 of the first inverter 10, which is duty-controlled, and gradually increases the level of the second output voltage V2 of the second inverter 20. As a result, the input voltage Vc at the connection point of the first capacitor C1 and the second capacitor C2 is not one half of the power supply voltage Vin but higher.

Time t5a to t5

When reaching time t5a, the control circuit 40 keeps the first and second switching elements Q11 and Q12 switched off and the third and fourth switching elements Q13 and Q14 switched on. The control circuit 40 generates the first output voltage V1 at zero volts with the first inverter 10. This control is performed until time t5. Further, the control circuit 40 duty-controls the fifth to eighth switching elements Q21 to Q24 of the second inverter 20 at a high frequency and generates the second output voltage V2 that is duty-controlled at a level between the input voltage Vc and the power supply voltage Vin.

This stops discharging the first capacitor C1, discharges the second capacitor C2, decreases the second inter-terminal voltage Vch2 of the second capacitor C2, and increases the first inter-terminal voltage Vch1 of the first capacitor C1. As a result, the input voltage Vc at the connection point of the first capacitor C1 and the second capacitor C2 returns to one half of the power supply voltage Vin (Vin/2).

In this manner, in the second embodiment, when the level of the second inverter 20 is switched, the duty control performed on the first inverter 10 at a high frequency is stopped. Further, the second inverter 20 is duty-controlled at a high frequency. During the switching performed in the short period in which the second inverter 20 is duty-controlled at a high frequency, the first inter-terminal voltage Vch1 of the first capacitor C1 may be equalized with the second inter-terminal voltage Vch2 of the second capacitor C2

Accordingly, in addition to the advantages of the first embodiment, the second embodiment allows for a decrease in the capacitance of the first capacitor C1 and the second capacitor C2, each of which handles one half of the power supply voltage Vin of the DC power supply 2. Consequently, the inverter device 1 may be further reduced in size.

Third Embodiment

An inverter device according to a third embodiment of the present invention will now be described with reference to FIG. 4.

In the inverter devices of the first and second embodiments, the control circuit 40 duty-controls the first and second inverters 10 and 20 based on predetermined patterns.

In contrast, in the inverter device of the third embodiment, the sine waveform W2 of the output voltage Vt shown in FIG. 2(*c*) is generated irrelevant to the time width Δt when switching the output voltage V2 of the second inverter 20. In other words, in the inverter device of the third embodiment, the first and second inverters 10 and 20 are duty-controlled in accordance with the present condition.

The description hereafter will center on the differences from the first and second embodiments and like portions will not be described in detail.

Figure 4:
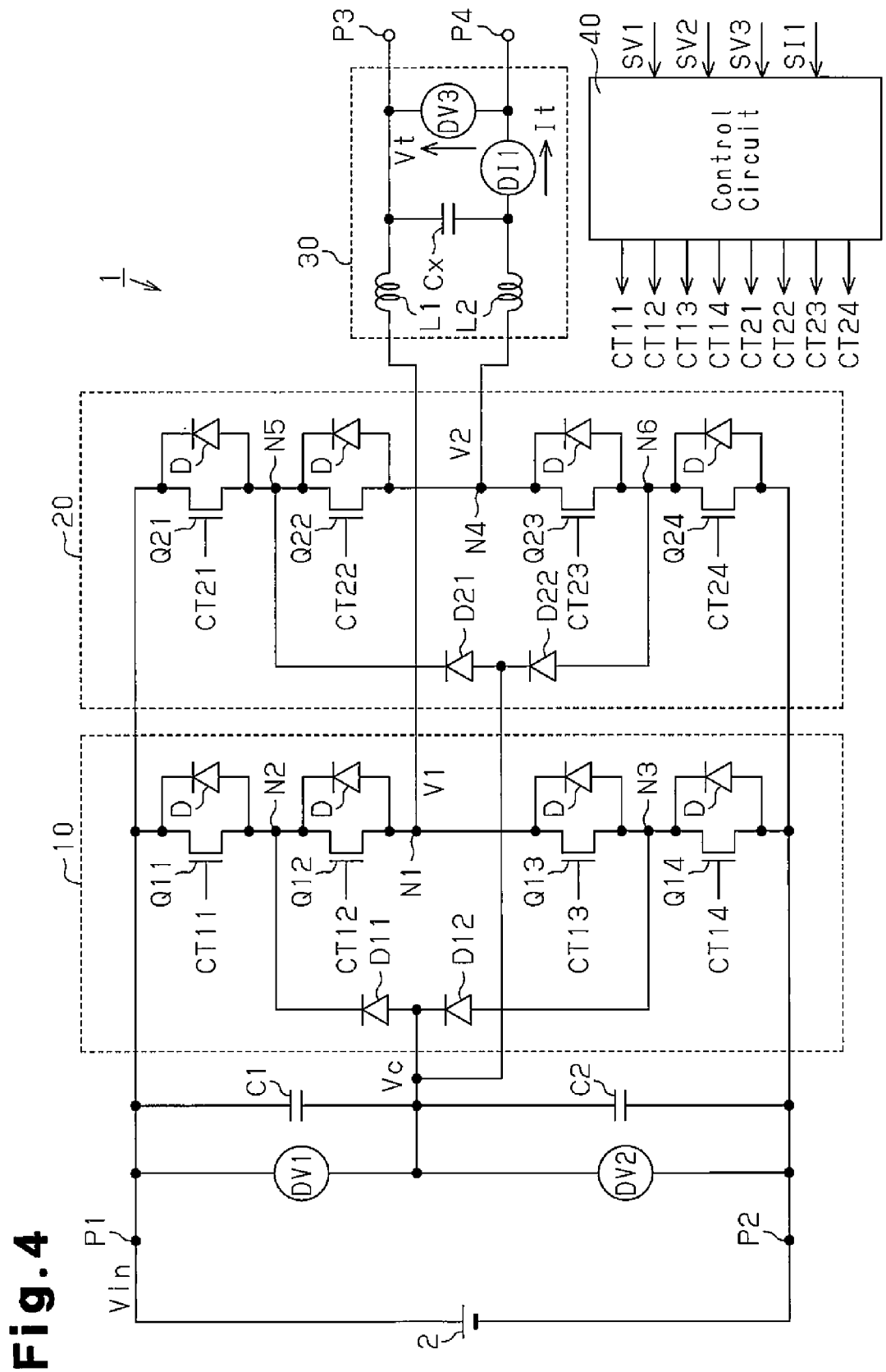
FIG. 4 is an electric circuit diagram of an inverter device according to a third embodiment of the present invention.

Referring to FIG. 4, a first voltage detector DV1 is connected in parallel to the first capacitor C1. The first voltage detector DV1 detects the present first inter-terminal voltage Vch1 of the first capacitor C1 and provides the control circuit 40 with a first voltage detection signal SV1 indicating the detected first inter-terminal voltage Vch1.

Further, a second voltage detector DV2 is connected in parallel to the second capacitor C2. The second voltage detector DV2 detects the present second inter-terminal voltage Vch2 of the second capacitor C2 and provides the control circuit 40 with a second voltage detection signal SV2 indicating the detected second inter-terminal voltage Vch2.

A third voltage detector DV3 is connected between the first and second output terminals P3 and P4 of the filter circuit 30. The third voltage detector DV3 detects the present output voltage Vt, which is supplied from the filter circuit 30, and provides the control circuit 40 with a third voltage detection signal SV3 indicating the detected output voltage Vt.

A current detector DI1 is connected between the second AC reactor L2 of the filter circuit 30 and the second output terminal P4. The current detector DI1 detects the current flowing from the filter circuit 30 to a load (not shown) and provides the control circuit 40 with a current detection signal SI1 indicating the detected current.

The control circuit 40 receives the first to third voltage detection signals SV1 to SV3 from the first to third detectors DV1 to DV3 and receives the current detection signal SI1 from the current detector DI1. Further, the control circuit 40 calculates the present first inter-terminal voltage Vch1 of the first capacitor C1 from the first voltage detection signal SV1 of the first voltage detector DV1. The control circuit 40 also calculates the present second inter-terminal voltage Vch2 of the second capacitor C2 from the second voltage detection signal SV2 of the second voltage detector DV2.

Additionally, the control circuit 40 calculates the output voltage Vt, the output current It, and the output power PW (Vt×It) presently supplied from the filter circuit 30 based on the third voltage detection signal SV3 of the third voltage detector DV3 and the current detection signal SI1 of the current detector DI1.

The control circuit 40 controls the first inverter 10 and the second inverter 20 in various modes based on the first inter-terminal voltage Vch1, the second inter-terminal voltage Vch2, the output voltage, the output current It, and the output power PW that are presently obtained.

Examples of control modes will now be described.

EXAMPLE 1

In the first embodiment, when switching the level of the second output voltage V2, the control circuit 40 duty-controls the fifth to eighth switching elements Q21 to Q24 at a high frequency during the predetermined time width Δt.

In example 1, the control circuit 40 starts duty-controlling the second inverter 20 at a high frequency when the output power PW reaches a predetermined value. Further, the control circuit 40 ends the high-frequency duty control of the second inverter 20 when the output power PW reaches a predetermined value.

Here, the high-frequency duty control of the second inverter 20 is performed using a comparator that is arranged in the control circuit 40. The control circuit 40 compares the present output voltage Vt with a predetermined reference value (e.g., predetermined triangular wave) to set the duty ratio (%). Then, the control circuit 40 duty-controls the second inverter 20 at a high frequency based on the set duty ratio (%).

In the first embodiment, the high-frequency duty control of the first inverter 10 during the period from time t0 to t6 is performed with a predetermined duty-control pattern.

In example 1, the control circuit 40 sets the duty ratio based on the present output power PW during the period from time t0 to t6. Then, the control circuit 40 duty-controls the first inverter 10 at a high frequency based on the set duty ratio.

During the period from time t0 to t6, the high-frequency duty control of the first inverter 10 is performed in the same manner with the comparator of the control circuit 40. The control circuit 40 sets the duty ratio (%) by comparing the present output voltage Vt with a predetermined reference value (e.g., predetermined triangular waveform). Then, the control circuit 40 duty-controls the first inverter 10 at a high frequency with the set duty ratio (%).

Accordingly, in this case, the commencement and termination of the high-frequency duty control are set for the second inverter 20 based on the actual output power PW presently supplied from the filter circuit 30. Further, the duty ratio for the high-frequency duty control is set based on the output voltage Vt.

Consequently, in addition to the advantages of the first embodiment, example 1 performs control in conformance with the actual conditions. This allows for the generation of the output voltage Vt with a sine waveform W2 from which distortion is further reduced.

EXAMPLE 2

In example 1 (and also the second embodiment), when switching the level of the second output voltage V2, the control circuit 40 duty-controls the fifth to eighth switching elements Q21 to Q24 at a high frequency during the predetermined time width Δt.

In the first embodiment, the first inverter 10 is duty-controlled at a high frequency. Instead, like in the second embodiment, when the second inverter 20 is duty-controlled at a high frequency, the first inverter 10 is controlled to maintain the first output voltage V1 at a constant voltage value.

In example 2, the control circuit 40 controls the first inverter 10, based on the presently obtained first inter-terminal voltage Vch1 of the first capacitor C1 and the second inter-terminal voltage Vch2 of the second capacitor C2, to maintain the first output voltage V1 at a constant voltage value. The control circuit 40 may not be able to equally divide the power supply voltage Vin with the first capacitor C1 and the second capacitor C2. Further, when the voltage at the connection point of the first capacitor C1 and the second capacitor C2 changes from a reference, which is one half of the power supply voltage Vin, and exceeds a predetermined specified value, the control circuit 40 starts a control on the first inverter 10 to maintain the first output voltage V1 at a constant value.

Under this situation, the control circuit 40 starts the high-frequency duty control on the second inverter 20. Here, in the same manner as example 1, the high-frequency duty control of the second inverter 20 is performed based on the duty ratio obtained by the comparator in the control circuit 40. Further, in the same manner as example 1, the control circuit 40 duty-controls the first inverter 10 at a high frequency when the high-frequency duty control of the second inverter 20 ends.

Accordingly, in this case, the commencement timing for the control that maintains the first output voltage V1 of the first inverter 10 at a constant value is set based on the present and actual first inter-terminal voltage Vch1 of the first capacitor C1 and second inter-terminal voltage Vch2 of the second capacitor C2.

Consequently, in addition to the advantages of the second embodiment, example 2 performs control in conformance with the actual conditions. This allows for the generation of the output voltage Vt with a sine waveform W2 from which distortion is further reduced.

EXAMPLE 3

In example 1, when switching the level of the second output voltage of the second inverter 20, the control circuit 40 duty-controls the second inverter 20 at a high frequency and then switches the level of the second output voltage. The first inverter 10 is also duty-controlled at a high frequency when the second inverter 20 is being duty-controlled at a high frequency.

In example 2, when switching the level of the second output voltage of the second inverter 20, the control circuit 40 duty-controls the second inverter 20 at a high frequency and then switches the level of the second output voltage. The first inverter 10 is controlled to maintain the first output voltage V1 at a constant value when the second inverter 20 is being duty-controlled at a high frequency.

In example 3, control modes may be switched in accordance with the situation between the control mode of example 1 (first control) and the control mode of example 2 (second control).

More specifically, the control circuit 40 performs the first control based on the present first inter-terminal voltage Vch1 of the first capacitor C1 and second inter-terminal voltage Vch2 of the second capacitor C2 when the voltage at the connection point of the first capacitor C1 and the second capacitor C2 is within a range of a predetermined specified value, which is set based on one half of the power supply voltage Vin.

In contrast, the control circuit 40 performs the first control based on the present first inter-terminal voltage Vch1 of the first capacitor C1 and second inter-terminal voltage Vch2 of the second capacitor C2 when the voltage at the connection point of the first capacitor C1 and the second capacitor C2 exceeds a predetermined specified value, which is set based on one half of the power supply voltage Vin.

Accordingly, in example 3, the optimal control is selected from the first control and the second control in accordance with changes in the present load. Further, in the inverter device 1, the capacitance of first and second capacitors C1 and C2 may be changed in accordance with the application.

Consequently, in addition to the advantages of example 1 and example 2, example 2 performs control in further conformance with the actual conditions. This allows for the generation of the output voltage Vt with a sine waveform W2 from which distortion is further reduced.

The above embodiments may be modified as described below.

The first and second inverters 10 and 20 in each of the above embodiments are three-level inverters. Instead, for example, four-level inverters or five-level inverters may be used.

The invention claimed is:

1. A method for controlling an inverter device, wherein the inverter device includes a first inverter capable of generating a first output voltage having a plurality of levels, a second inverter connected in parallel to the first inverter and capable of generating a second output voltage having a plurality of levels, a filter circuit that combines the first output voltage and the second output voltage and generates an output voltage having a sine waveform, and a control circuit that controls the first inverter and the second inverter to generate a first output voltage having a plurality of levels with the first inverter and generate a second output voltage having a plurality of levels with the second inverter so that the filter circuit generates an output voltage having a predetermined sine waveform, the plurality of levels of the first output voltage includes a first level, a second level, and a third level, the method comprising:

duty-controlling the first inverter at a high frequency with the control circuit to switch the first output voltage between the first level and the second level;

duty-controlling the first inverter at a high frequency with the control circuit to switch the first output voltage between the second level and the third level; and controlling the second inverter with the control circuit to switch the second output voltage to any one of the plurality of levels, wherein the controlling the second inverter includes duty-controlling the second inverter at a high frequency when the second inverter switches the level of the second output voltage.

2. The method according to claim 1, comprising stopping the duty control of the first inverter that is duty-controlled at the high frequency when the second inverter is duty-controlled at a high frequency with the control circuit.

3. The method according to claim 1, wherein each of the first and second inverters is a three-level inverter and connected to a connection point between a first capacitor and a second capacitor that are connected in series and equally divide DC voltage, the method comprising generating the first and second output voltages having three levels using the voltage at the connection point with the first and second inverters.

4. An inverter device comprising:
a first inverter capable of generating a first output voltage having a plurality of levels;
a second inverter connected in parallel to the first inverter and capable of generating a second output voltage having a plurality of levels;
a filter circuit connected to the first inverter and the second inverter, wherein the filter circuit combines the first output voltage and the second output voltage and generates an output voltage having a sine waveform; and
a control circuit that controls the first inverter and the second inverter to generate a first output voltage having a plurality of levels with the first inverter and generate a second output voltage having a plurality of levels with the second inverter so that the filter circuit generates an output voltage having a predetermined sine waveform, wherein
the plurality of levels of the first output voltage includes a first level, a second level, and a third level,
the control circuit is configured to:
duty-controls the first inverter at a high frequency to switch the first output voltage between the first level and the second level;
duty-controls the first inverter at a high frequency to switch the first output voltage between the second level and the third level; and
control the second inverter to switch the second output voltage to any one of the plurality of levels, and
the control circuit duty-controls the second inverter at a high frequency when the second inverter switches the level of the second output voltage.

5. The inverter device according to claim 4, wherein the control circuit stops the duty control of the first inverter that is duty-controlled at the high frequency when the second inverter is duty-controlled at a high frequency.

6. The inverter device according to claim 4, wherein the control circuit includes
a first control mode that duty-controls the first inverter at a high frequency when the second inverter is duty-controlled at a high frequency, and
a second control mode that stops duty-controlling the first inverter when the second inverter is duty-controlled at a high frequency.

7. The inverter device according to claim 6, comprising a first capacitor and a second capacitor connected in series, wherein the first capacitor and the second capacitor equally divide DC voltage,
wherein the control circuit switches a control mode to one of the first control mode and the second control mode based on voltage at a connection point between the first capacitor and the second capacitor.

8. The inverter device according to claim 4, comprising a first capacitor and a second capacitor connected in series, wherein the first capacitor and the second capacitor equally divide DC voltage, wherein
each of the first and second inverters is a three-level inverter and connected to a connection point between the first capacitor and the second capacitor, and
the first and second inverters generate the first and second output voltages having three levels using the voltage at the connection point.

9. The inverter device according to claim 8, wherein the control circuit starts duty-controlling the second inverter at a high frequency based on voltage at the connection point between the first capacitor and the second capacitor and stops duty controlling the first inverter when the second inverter is duty-controlled at a high frequency.

10. The inverter device according to claim 8, wherein each of the first and second inverters includes
a first series circuit including four series-connected switching elements, and
a second series circuit including two series-connected clamping diodes;
the four switching elements include two switching elements at an upper arm side and two switching elements at a lower arms side, and the two clamping diodes include a clamping diode at an upper arm side and a clamping diode at a lower arm side;
the upper arm side clamping diode includes a cathode terminal connected to a connection node between the two upper arm side switching elements, and the lower arm side clamping diode includes an anode terminal connected to a connection node between the two lower arm side switching elements; and
the connection node between the first capacitor and the second capacitor is connected to a connection node between the two clamping diodes, and the filter circuit is connected to a connection node between the two upper arm side switching elements and the two lower side switching elements.

\* \* \* \* \*